United States Patent
Albrecht

(10) Patent No.: US 6,776,439 B2
(45) Date of Patent: Aug. 17, 2004

(54) FLANGE PLATES FOR FLUID PORT INTERFACES

(76) Inventor: David E. Albrecht, 1383 Granary Rd., Blue Bell, PA (US) 19422

( * ) Notice: Subject to any disclaimer, the term of this patent is extended or adjusted under 35 U.S.C. 154(b) by 0 days.

(21) Appl. No.: 10/082,501

(22) Filed: Feb. 25, 2002

(65) Prior Publication Data

US 2002/0121746 A1 Sep. 5, 2002

Related U.S. Application Data

(63) Continuation of application No. 09/443,793, filed on Nov. 18, 1999.

(51) Int. Cl.[7] .................................................. F15D 1/02
(52) U.S. Cl. ..................... 285/189; 285/901; 285/334.1; 138/40
(58) Field of Search .............................. 285/901, 139.2, 285/334.1; 138/40, 44, 89

(56) References Cited

U.S. PATENT DOCUMENTS

| | | | | |
|---|---|---|---|---|
| 757,376 A | * | 4/1904 | Whitaker | 138/89 |
| 1,389,542 A | * | 8/1921 | Wereley | 138/89 |
| 1,503,371 A | * | 7/1924 | Meyer | 138/40 |
| 1,515,408 A | * | 11/1924 | Puffer | 138/40 |
| 2,391,586 A | * | 12/1945 | Miller | 138/40 |
| 2,520,089 A | * | 8/1950 | Lippincott | 138/40 |
| 2,526,795 A | * | 10/1950 | Andrews | 220/89.2 |
| 2,608,098 A | * | 8/1952 | Paulsen | 73/863.83 |
| 2,987,218 A | | 6/1961 | Erickson et al. | |
| 3,167,322 A | | 1/1965 | Aichroth | |
| 3,207,184 A | * | 9/1965 | Lambert | 138/89 |
| 3,215,442 A | | 11/1965 | Papenquth | |
| 3,329,447 A | * | 7/1967 | Hitz | 285/113 |
| 3,467,271 A | | 9/1969 | Kaiser et al. | |
| 3,531,133 A | | 9/1970 | Sheesley et al. | |
| 3,628,686 A | * | 12/1971 | Burton et al. | 220/784 |
| 3,704,021 A | | 11/1972 | Barbarin et al. | |
| 3,857,574 A | | 12/1974 | Artzer | |
| 4,027,698 A | | 6/1977 | Weinhold | |
| 4,064,912 A | | 12/1977 | Petrone | |
| 4,095,809 A | | 6/1978 | Smith | |
| 4,255,090 A | | 3/1981 | Pratt | |
| 4,346,848 A | | 8/1982 | Malcolm | |
| 4,364,587 A | * | 12/1982 | Samford | 285/3 |
| 4,429,719 A | * | 2/1984 | Mosing | 138/96 T |
| 4,553,559 A | | 11/1985 | Short, III | |
| 4,750,370 A | | 6/1988 | Ossyra | |
| 4,751,938 A | * | 6/1988 | Kerns et al. | 137/68.25 |
| 4,850,600 A | | 7/1989 | Kaetscher et al. | |
| 5,071,140 A | * | 12/1991 | Quevedo del Rio | 277/608 |
| 5,133,185 A | * | 7/1992 | Gilbreath et al. | 60/309 |
| 5,229,785 A | | 7/1993 | Leban | |
| 5,305,796 A | | 4/1994 | Klak | |
| 5,333,649 A | * | 8/1994 | Shimokawa et al. | 138/89 |
| 5,518,257 A | | 5/1996 | Breaker | |
| 6,032,515 A | | 3/2000 | Huber | |
| 6,053,056 A | | 4/2000 | Zaiser et al. | |
| 6,082,183 A | | 7/2000 | Huber | |

* cited by examiner

*Primary Examiner*—David E. Bochna
(74) *Attorney, Agent, or Firm*—William H. Eilberg

(57) ABSTRACT

Flange plates control the flow of fluid between fluid handling devices. In one embodiment, a sealing plate includes an O-ring and a structural support ring disposed within the O-ring. The support ring prevents the O-ring from being dislodged due to fluid pressure in the line. The support ring may have chamfers which aid in centering the O-ring. The support ring may also have a plurality of orifices allowing fluid flow between the interior of the support ring and the O-ring. In another embodiment, a blanking plate includes a domed portion, oriented in a direction towards the fluid being contained. The domed portion imparts strength to the blanking plate, allowing the plate to be made of a thinner piece of material. In another embodiment, an orifice plate includes a domed portion as described above, with an orifice located at the center of the dome. The invention also provides sealing plates which provide structural support for slip-in fluid modules, and which also have central bores which transition from one diameter to another, allowing fluid components having ports of differing diameters to be connected together.

5 Claims, 11 Drawing Sheets

FLANGE PLATES FOR FLUID PORT INTERFACES

CROSS-REFERENCE TO PRIOR APPLICATION

This is a continuation of U.S. patent application Ser. No. 09/443,193, filed Nov. 18, 1999, entitled FLANGE PLATES FOR FLUID PORT INTERFACES.

BACKGROUND OF THE INVENTION

The present invention relates to the field of fluid control. The invention comprises plates for attachment to an end of a fluid conduit, or for use at an interface between fluid conduits, the plates having specific structures for governing the flow of fluid.

The plates of the present invention solve various problems encountered in fluid handling. For example, it is often necessary to connect two fluid handling components together, such that fluid flows smoothly from one component to the next. At the interface between components, one must provide a seal which prevents fluid from leaking out, and which prevents contaminants from the outside from entering the fluid. The seal should be sufficiently strong that it will withstand fluid pressure in the line, but not so heavy that its cost becomes prohibitive.

Sometimes it is necessary, such as for purposes of maintenance, to block the flow through a fluid port. A plate is typically used to block off an end of a fluid conduit. The plate must be strong enough to perform the desired blocking function, but not so thick that the plate becomes unduly expensive.

Another problem solved by the present invention is the need to provide a controlled flow, through an orifice of known size, from a fluid handling component. The same considerations noted above, such as strength and cost of the orifice plate, are relevant here. One requires an orifice plate that will withstand fluid pressure in the line, but which is not prohibitively expensive.

Various plates have been devised, in the prior art, to provide the above-described functions. Such plates typically comprise flanges which are affixed to a fluid port, or between adjoining fluid ports, the plates having various patterns formed therein. These plates are generally made according to certain standardized patterns. For hydraulic systems, a common flange pattern is SAE No. J518, although other standards have been used.

For purposes of describing the present invention, this specification will use the rectangular flange pattern according to the above-mentioned SAE standard. The present invention therefore comprises improvements over the standard plates described above. However, those knowledgeable in the art will recognize that the invention can be applied to all flange-like port interfaces, including those having multiple ports as well as those having single port connections.

SUMMARY OF THE INVENTION

In one embodiment, the present invention includes a sealing plate, intended to be sandwiched between two fluid handling components, the sealing plate having an annular seal and a structural support ring. The annular seal may be an O-ring or equivalent flexible seal, and the structural support ring is disposed within the interior region of the annular seal. The outside diameter of the support ring is preferably greater than the inside diameter of the annular seal, so that the support ring and annular seal are held in place. This structure has the advantages that it prevents the seal from being dislodged by fluid pressure, and that it provides some structural support for valve bodies or other components that may be adjacent to the plate.

In the preferred embodiment, the structural support ring has chamfers along its outer edge, so as to provide a seat for the O-ring. The support ring may also include a plurality of orifices allowing fluid flow between the interior of the support ring and the O-ring seal.

Another embodiment of the invention includes a blanking plate which closes off a fluid conduit. The blanking plate of the present invention has a domed portion, disposed at or near the center of the plate, the domed portion being pointed towards the fluid being contained. The advantage of this structure is that it substantially increases the effective strength of the plate, making it feasible to use a relatively thin plate to contain a relatively high-pressure fluid.

Another embodiment of the invention includes an orifice plate which provides a controlled flow of fluid from one fluid component to another. The orifice plate includes a domed portion, like that of the preceding embodiment, but the domed portion has an orifice, preferably disposed at the center of the dome. This arrangement is believed to maximize the efficiency of the flow, because the highest flow velocity is found near the center of the fluid port or conduit, and the leading sharp edge orifice is less sensitive to changes in viscosity of the fluid.

In another embodiment, the invention includes a sealing plate which provides a smooth transition from one diameter to another. The sealing plate may also include additional seals disposed on the face which receives a fluid component. These embodiments make it easy to connect various fluid handling components, with maximum efficiency, even where the diameters of all of the ports do not match.

The present invention therefore has the primary object of providing a plurality of flange plates for use with fluid port interfaces.

The invention has the further object of providing an improved seal for connection of fluid handling components.

The invention has the further object of reducing the size and cost of flange plates which provide fluid seals.

The invention has the further object of preventing dislodgment of flexible seals in fluid handling equipment.

The invention has the further object of preventing damage to valve bodies in fluid handling equipment.

The invention has the further object of reducing the size and cost of blanking plates used to block fluid flow through a port.

The invention has the further object of reducing the size and cost of orifice plates used to provide a controlled fluid flow from a port.

The invention has the further object of providing sealing plates having smooth transitions which allow fluid components having different port diameters to be efficiently connected together.

The invention has the further object of providing sealing plates which provide structural support for slip-in fluid component modules such as axial flow cartridge valves.

The reader skilled in the art will recognize other objects and advantages of the present invention, from a reading of the following brief description of the drawings, the detailed description of the invention, and the appended claims.

DETAILED DESCRIPTION OF THE INVENTION

Figures 1A, 1B:
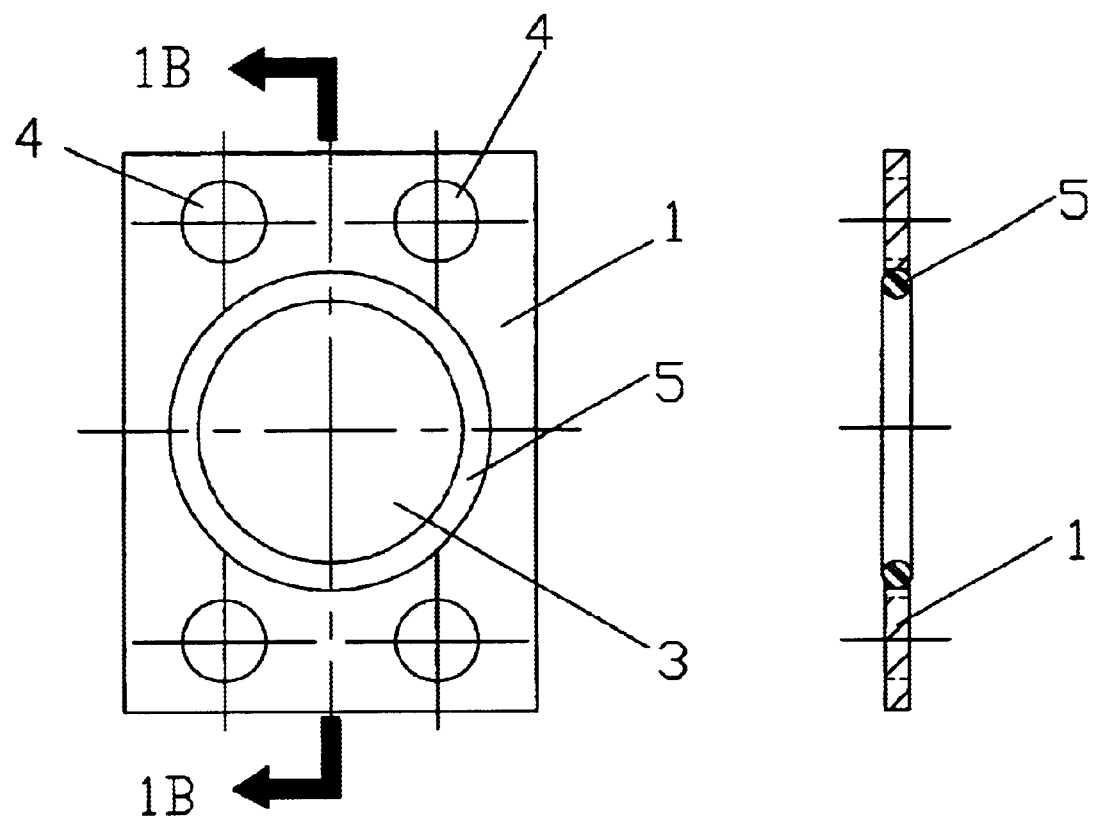
FIGS. 1A and 1B provide front and end views, respectively, of a sealing plate of the prior art.

One embodiment of the present invention includes a sealing plate which represents a substantial improvement over the prior art plate shown in FIGS. 1A and 1B. As shown in FIGS. 1A and 1B, a conventional sealing plate 1 defines an opening 3 which is intended to match an opening on a fluid conduit of a valve or other fluid handling device (not shown). The plate is attached to such device by bolts, or their equivalent, the bolts being inserted through bolt holes 4. All of the plates shown in the drawings, and described in this specification, have similar bolt holes, and are attachable to fluid handling devices in the same way.

Figure 3A:
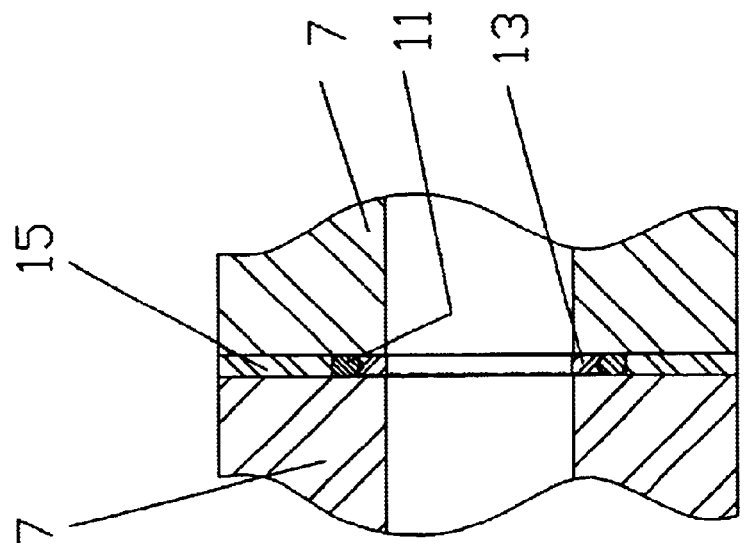
FIG. 3A provides a fragmentary cross-sectional view of a sealing plate of the prior art, installed between two fluid ports.

An annular seal 5 (depicted as an O-ring) is disposed within the boundary of opening 3. In FIG. 3A, the prior art sealing plate of FIGS. 1A and 1B is shown installed between fluid handling components 7, which may be valves, fluid conduits, or other devices.

Figure 4B:
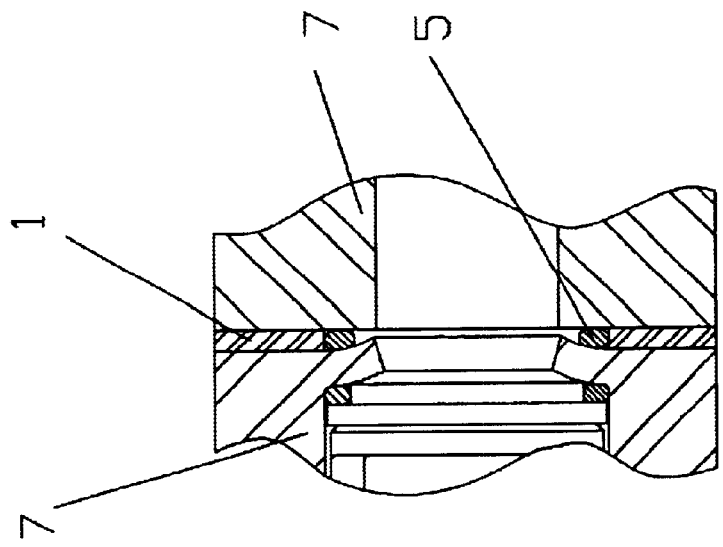
FIG. 4B provides a fragmentary cross-sectional view showing deformation of a valve module in an arrangement of the prior art.
Figure 4A:
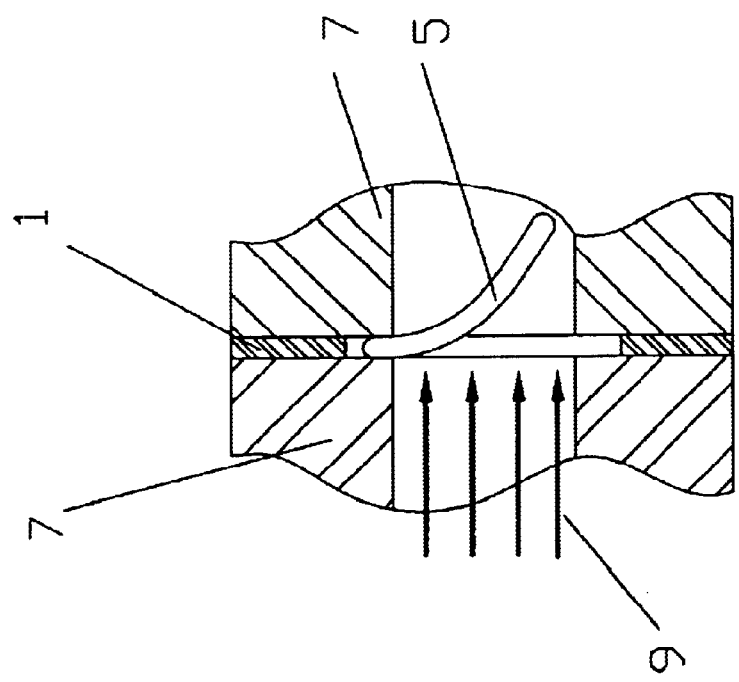
FIG. 4A provides a fragmentary cross-sectional view showing an O-ring seal being dislodged, when using a sealing plate of the prior art.

The problems encountered with the sealing plate of FIGS. 1A and 1B are illustrated in FIGS. 4A and 4B. FIG. 4A shows how the force of fluid flow, symbolized by arrows 9, can dislodge the seal 5. The result is a partial or total failure of the seal, causing the introduction of contaminants into the flow, or leaking between components.

FIG. 4B shows how a valve body can become distorted when it presses against the seal. Since the plate of the prior art has no solid member within the boundary of the O-ring, there is nothing to support the valve body. One solution to the problem illustrated in FIG. 4B is to make the valve body thicker and heavier, so that it is less likely to become distorted. The latter solution may be effective, but it is unduly costly.

Figure 2A:
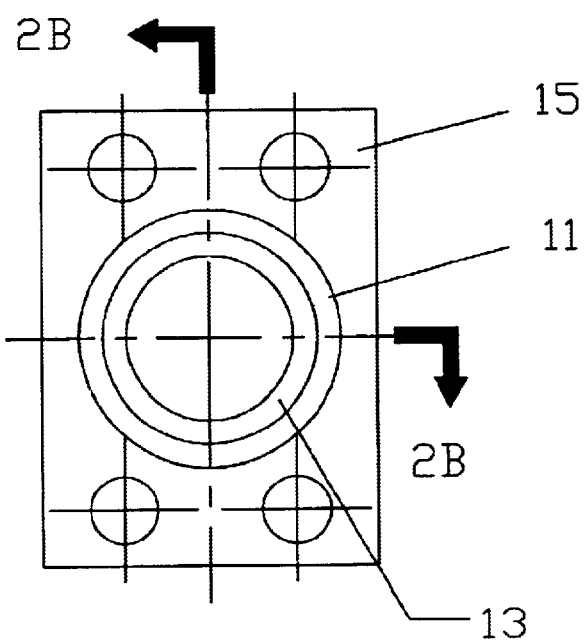
FIG. 2A provides a front view of the sealing plate made according to the present invention.
Figure 2B:
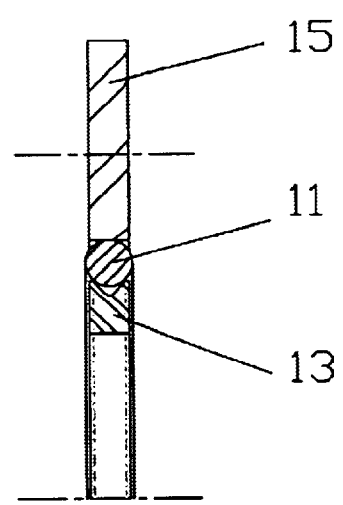
FIG. 2B provides a cross-sectional view, taken along the line 2B—2B of FIG. 2A.

FIGS. 2A and 2B illustrate an embodiment of the present invention which overcomes the above-described problems. As shown in these figures, a support ring 13 sits within the annular seal or O-ring 11 of the sealing plate 15. The diameter of the support ring is chosen such that the support ring and the annular seal are held in place. The support ring is preferably made of metal. It can also be made of other materials which are hard compared with the relatively resilient material of the O-ring.

Figure 3B:
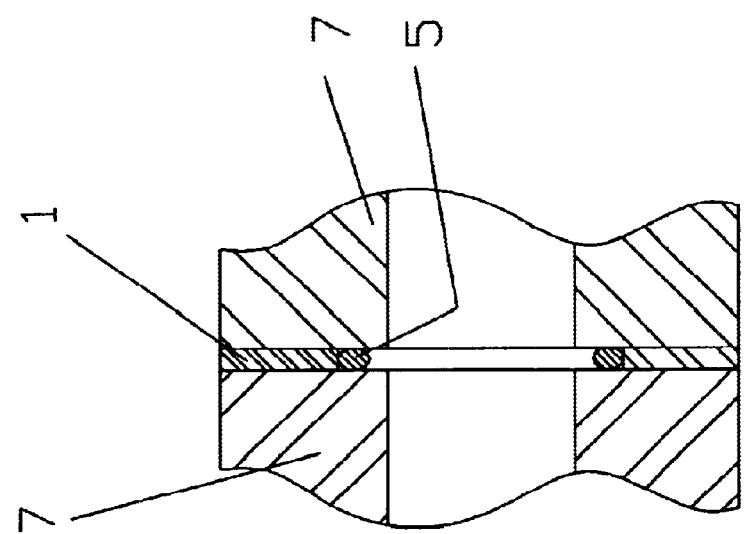
FIG. 3B provides a view similar to that of FIG. 3A, but instead showing the sealing plate of the present invention.

FIG. 3B illustrates the sealing plate of the present invention, as installed between two fluid handling components. The latter components are identified by reference numeral 7, the same as in FIG. 3A, because the fluid handling components can be the same in both cases. FIG. 3B shows the sealing plate 15 of the present invention, sandwiched between the fluid handling components. FIG. 3B also shows the annular seal 11 and the support ring 13.

The support ring prevents the problems depicted in FIGS. 4A and 4B. In particular, by holding the O-ring in place, the O-ring is unlikely to become dislodged even under the influence of high fluid velocity in the line. Also, the support ring provides a supporting surface against which a valve or other component can bear. The support ring thus prevents a valve body, or other part of a fluid handling component, from entering the interior region of the O-ring. The support ring therefore prevents the damage shown in FIG. 4B.

Figure 5A:
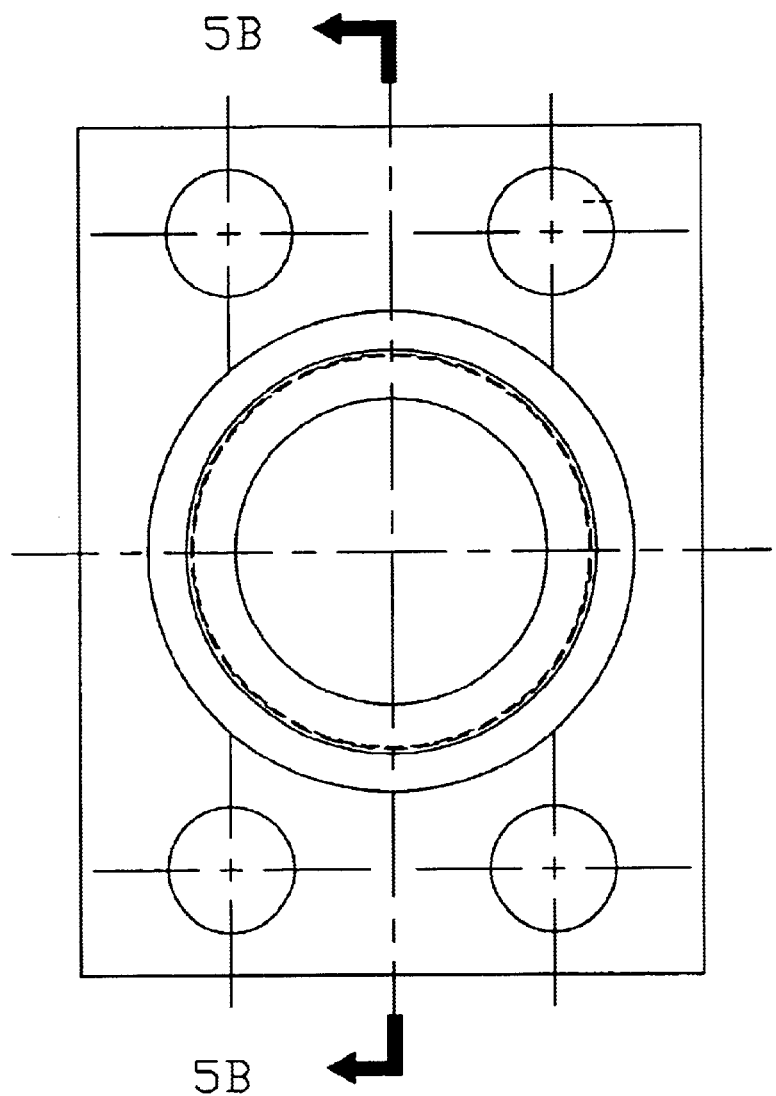
FIG. 5A provides a front view of a preferred embodiment of the present invention, wherein the support ring has a chamfer which supports an O-ring.
Figure 5B:
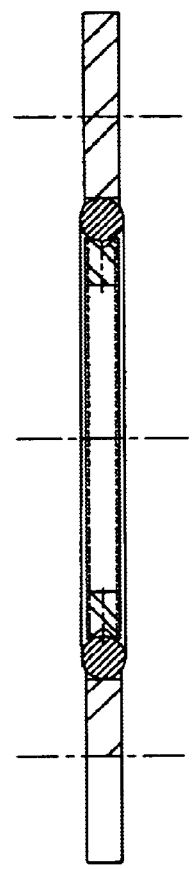
FIG. 5B provides a cross-sectional view, taken along the line 5B—5B in FIG. 5A.

FIGS. 5A and 5B illustrate a preferred embodiment of the sealing plate of the present invention. In this embodiment, the support ring has a chamfer which centers the O-ring in its desired position. Moreover, in this embodiment, the support ring has a width which is the same as, or slightly less than, the width of the sealing plate. In the preferred embodiment, the chamfers are opposing 45° chamfers. That is, the chamfers form an angle of about 45° with respect to the axis of the support ring. In one preferred embodiment, the root where the 45° chamfers join has a nominal internal radius of 0.020 inches, to minimize stress concentration. Also, in the preferred embodiment, both outer ends of the support ring have flat portions which are at least 0.005 inches wide, to prevent the seal from being damaged. All of the latter figures are intended only as examples, and are not intended to limit the invention to any particular dimensions.

It is preferable to make the outside diameter of the support ring greater than the inside diameter of the annular seal, to prevent the components from coming apart during handling. This geometry also insures that the annular seal will fit within the cavity defined by the sealing plate and the support ring.

The centering chamfer aids in positioning the support ring in the center of the annular seal (O-ring). The chamfer also makes it easier to supply the sealing plate and the O-ring as an assembly together with the support ring. During preloading of the O-ring, the support ring assists in directing the displacement of the O-ring towards the joints that are being sealed.

Figures 5C, 5D:
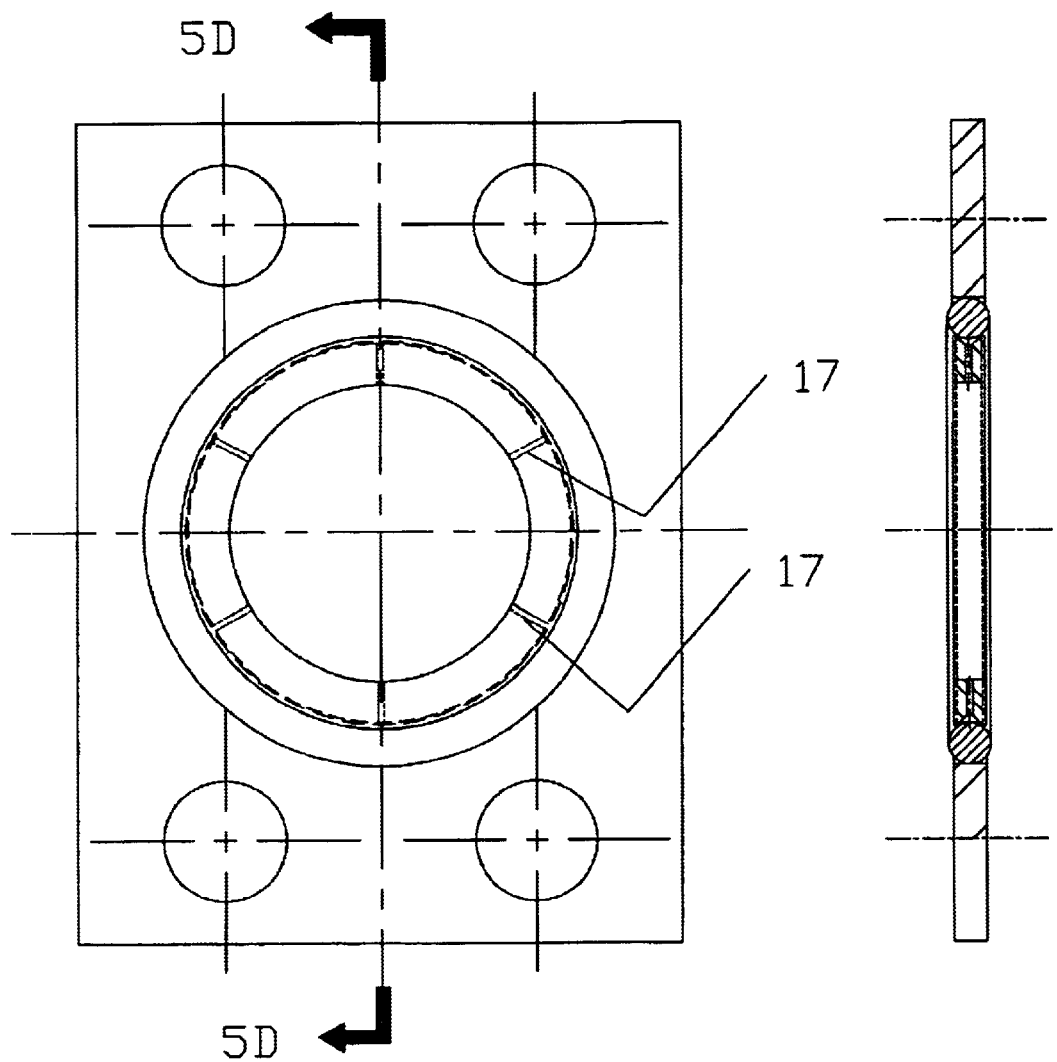
FIG. 5C provides a front view of another alternative embodiment of the present invention, wherein the support ring has a plurality of orifices.
FIG. 5D provides a cross-sectional view, taken along the line 5D—5D of FIG. 5C.

An alternative embodiment of the invention is shown in FIGS. 5C and 5D. In this embodiment, the support ring includes orifices 17 which direct the flow of fluid from a pressurized port to the center underside of the annular seal. This arrangement insures that the fluid loading of the seal is outward, toward the joints that are being sealed. When the system pressure is reduced, fluid decompression is permitted through these orifices.

Figure 5E:
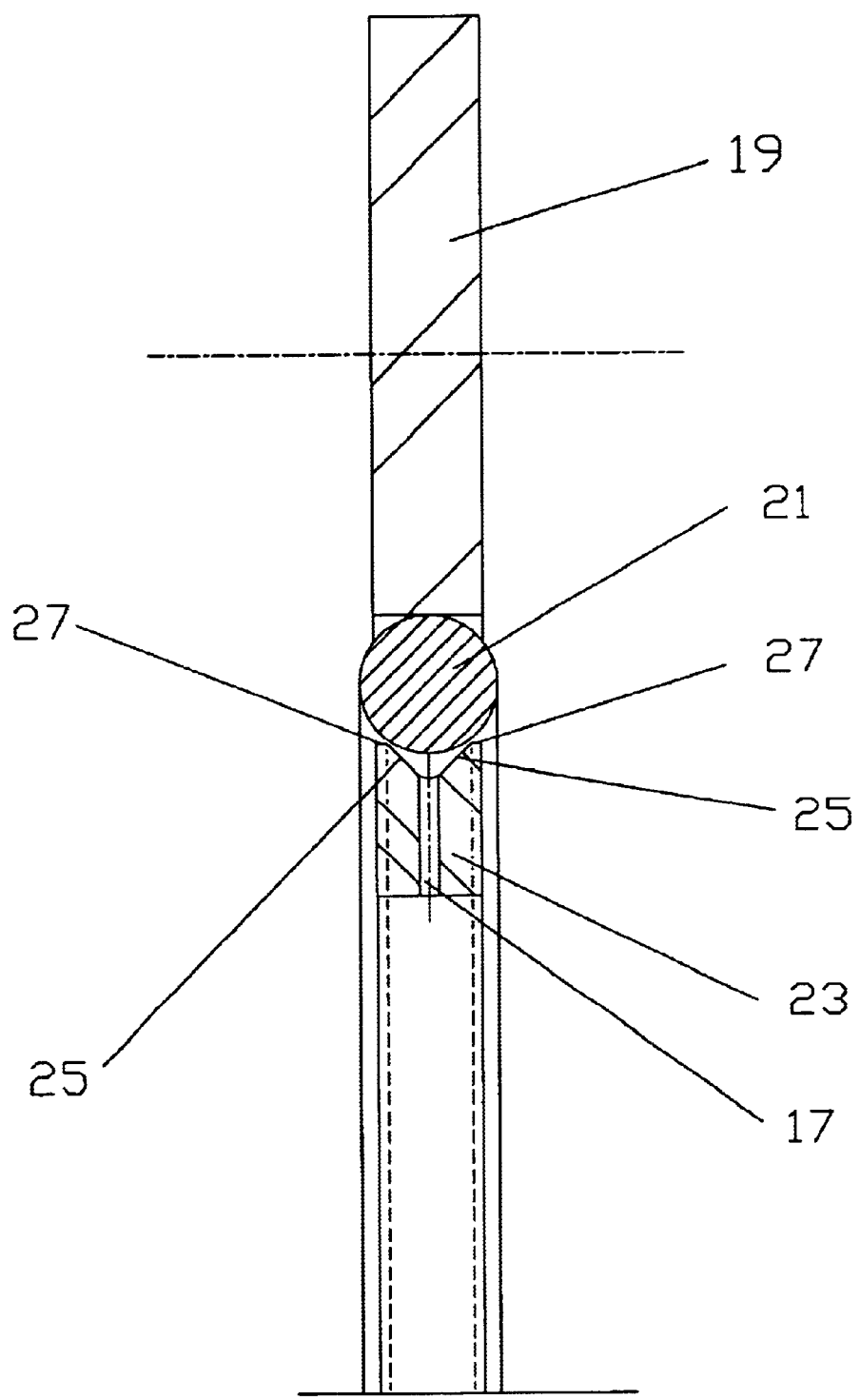
FIG. 5E provides an enlarged cross-sectional view of the embodiment of the present invention shown in FIGS. 5C and 5D, illustrating the relationship between the O-ring, the support ring, and the orifice.

The embodiments of FIGS. 5A–5D are summarized in the enlarged view of FIG. 5E. FIG. 5E shows sealing plate 19 having annular seal (O-ring) 21, and structural support ring 23. The orifice 17 in the support ring is clearly visible. FIG. 5E also shows chamfered surfaces 25, and flat outer ends 27. Note also that in FIG. 5E, the outside diameter of the support ring is larger than the inside diameter of the O-ring; this feature tends to hold these parts together.

Figures 6A, 6B:
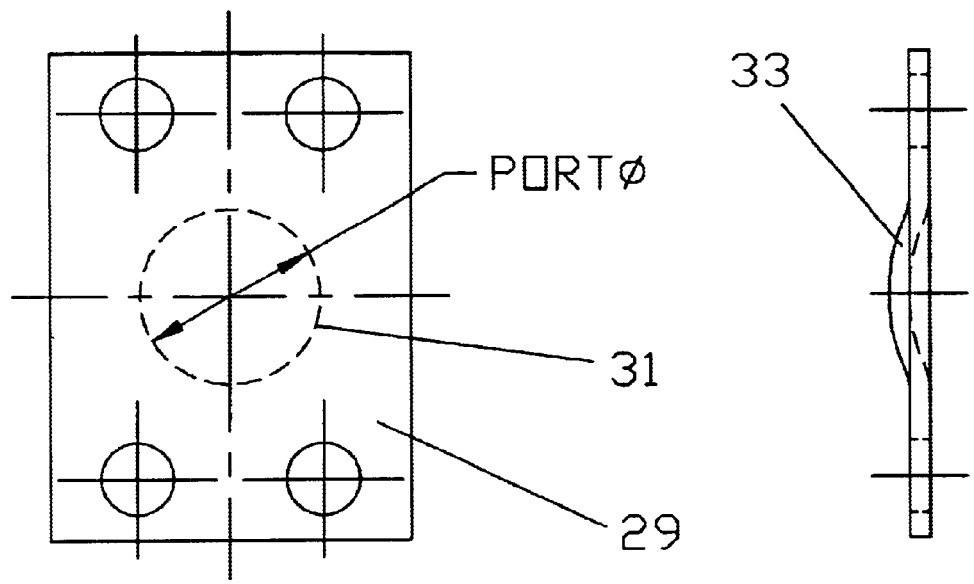
FIGS. 6A and 6B provide front and end views of a blanking plate made according to the present invention.

FIGS. 6A and 6B illustrate another embodiment of the invention. This embodiment comprises a blanking plate, which is used to block the flow of fluid up to the maximum pressure rating in the line. Blanking plate 29 is shown with dotted line 31 which indicates the diameter of the port to be blocked. The end view of FIG. 6B shows dome 33, formed integrally with the plate. The dome faces the fluid side that is to be blocked and pressurized. In other words, the dome is convex on the side that contacts the fluid. The dome provides a smooth transition from the flat surface of the plate to the apex of the dome, at or near the center of the plate.

The dome permits the relatively thin plate to withstand a higher pressure, without damage, than would be possible with a flat blanking plate made of the same material and having the same thickness. Use of the dome therefore achieves a reduction in weight and cost, because one can use a relatively thin plate and still provide sufficient strength to withstand the pressurized fluid.

Figures 7A, 7B:
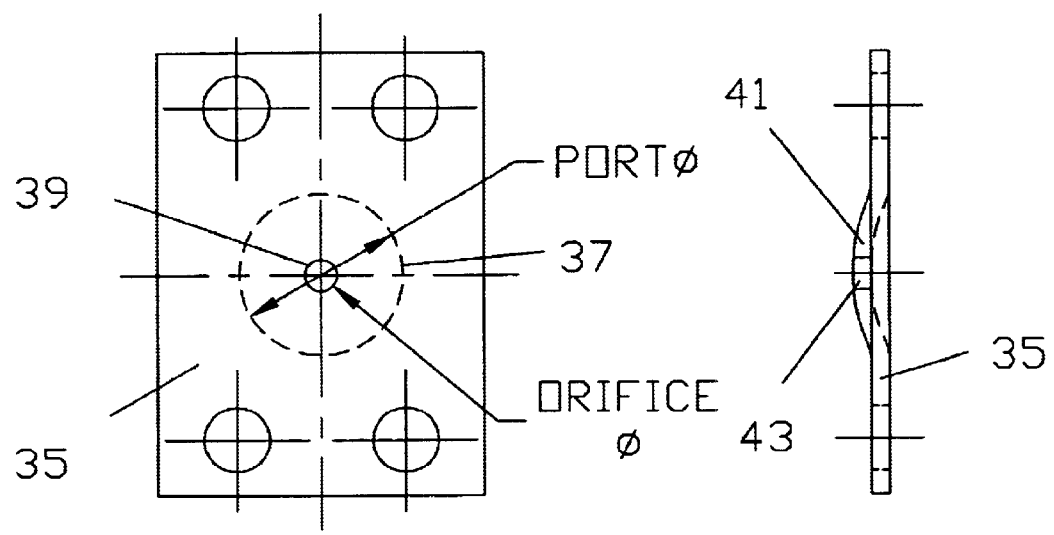
FIGS. 7A and 7B provide front and end views of a plate made according to the present invention, the plate having an orifice for controlling fluid flow, and having a dome shape for strengthening the plate relative to the fluid flow.

FIGS. 7A and 7B depict another embodiment of the present invention. These figures show orifice plate 35, which is used to control the flow in a fluid line by allowing the fluid to escape through an orifice of known diameter. As in FIG. 6A, dotted line 37 indicates the diameter of the fluid port against which the orifice plate sits. The plate includes an orifice 43, the position of the orifice being indicated by circle 39 in FIG. 7A. As in the embodiment of FIGS. 6A and 6B, the plate includes a smoothly curved dome 41, which enables the plate to withstand relatively high fluid pressures in the line. The dome is intended to be oriented facing the side from which flow is to be controlled.

As shown in FIG. 7B, the orifice is positioned at the center of the dome. This arrangement insures that the orifice comprises a leading sharp edge orifice in the center of the flow conduit, making the orifice relatively insensitive to changes in the viscosity of the fluid. Efficiency is believed to be maximized because the highest flow velocity is found near the center of the fluid conduit, i.e. at the center of the plate, and the leading sharp edge orifice is less sensitive to changes in fluid viscosity. Also, the use of the domed structure saves weight and reduces cost, for the same reasons given with respect to the embodiment of FIGS. 6A and 6B.

Another embodiment of the invention comprises a plate which provides both sealing and structural support for slip-in fluid modules, such as valves, filters, etc., and which also works with modules having port sizes different from the flange port size. The term "slip-in", as used herein, means that the component slides into a cavity in an appropriate block or flange body or other holding means, rather than being screwed in. An example of a fluid component with which this embodiment can be used is an axial flow cartridge valve. The cartridge slides into a cavity in a block, the cavity being sized to accommodate the cartridge.

Figures 8A, 8B:
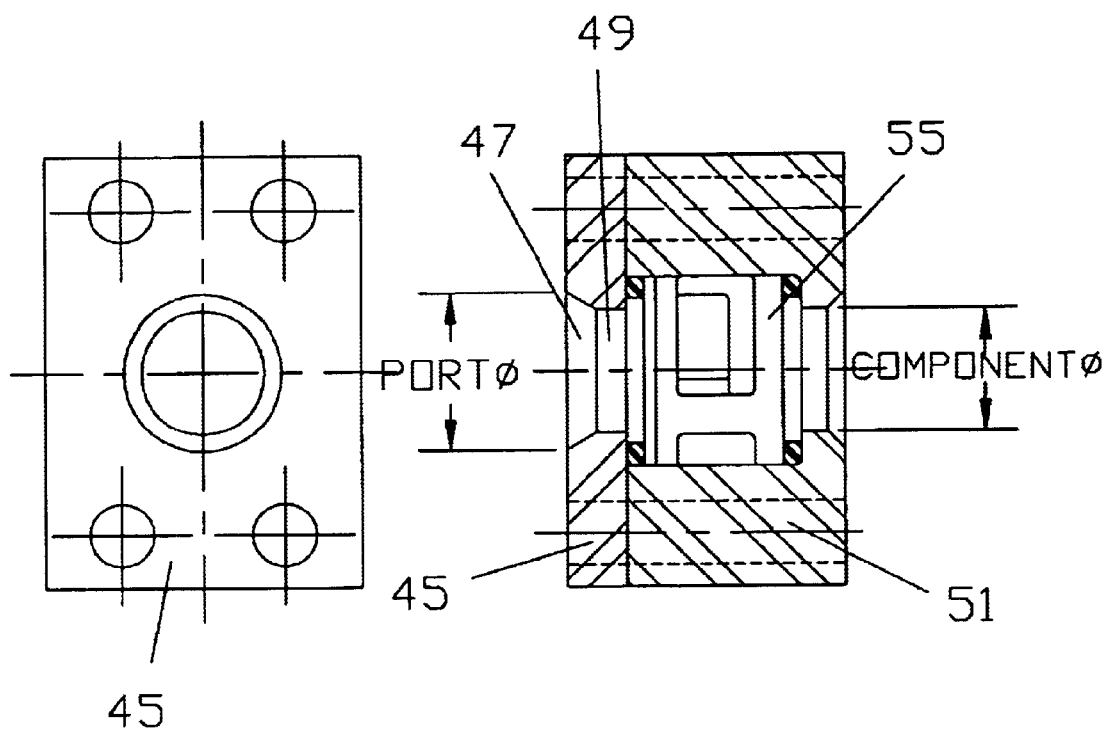
FIGS. 8A and 8B provide front and cross-sectional views of another embodiment of the present invention, wherein a sealing plate provides a sealing surface and a structural support for slip-in fluid modules having ports that are smaller than the flange port size.

FIGS. 8A and 8B provide an example of a sealing plate used with a slip-in valve module. The slip-in valve module 55 has an inside diameter, symbolically indicated on the right-hand side of FIG. 8B, the inside diameter of the valve module being significantly smaller than the inside diameter of the port, indicated at the left-hand side of the drawing. Seal plate 45 includes outer bore 47, which provides a smooth transition to inner bore 49. The seal plate abuts fluid flange body 51. Due to its reduced diameter opening, the seal plate provides structural support as well as a sealing surface for the slip-in valve module. The diameter of the inner bore of the seal plate is smaller than the diameter of the seals associated with the fluid component.

The seal plate 45 shown in FIG. 8B is relatively thick. The seal plate should be sufficiently thick to provide adequate support for the valve module, especially in the event of a pressure failure in the line. For example, if the pressure drops abruptly on the left-hand side of FIG. 8B, the seal plate will be urged to the left, due to the fluid pressure in the valve. If the seal plate is too thin, it may not withstand the fluid pressure, and will bow outward, to the left, allowing the valve module to shift to the left and to become damaged.

Figures 9A, 9B:
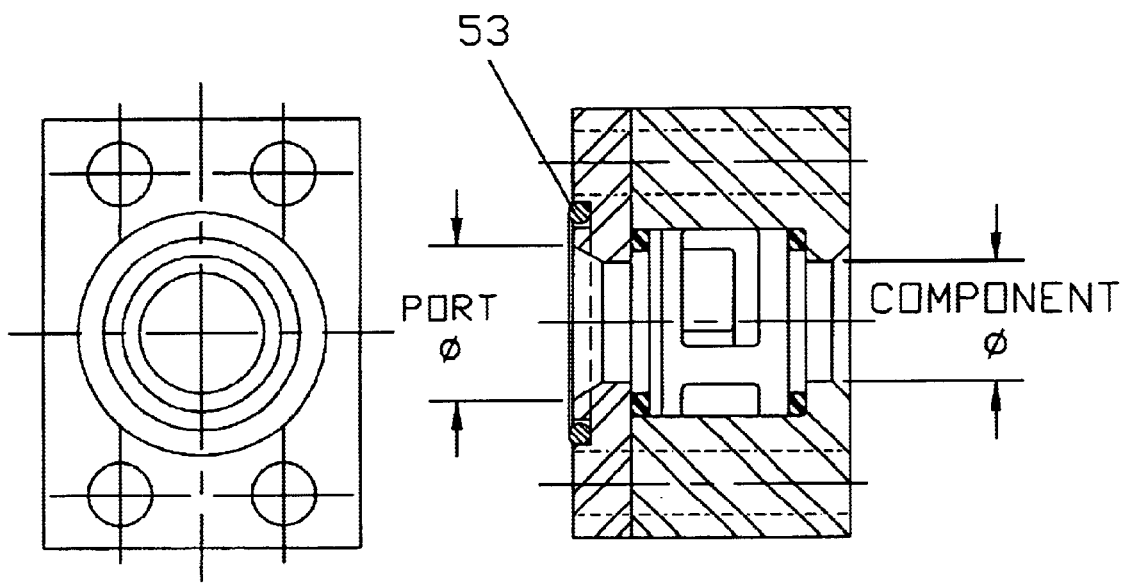
FIGS. 9A and 9B provide front and cross-sectional views of another embodiment similar to that of FIGS. 8A and 8B, except that the sealing plate also includes a face seal.

FIGS. 9A and 9B provide illustrations of an alternative to FIGS. 8A and 8B, wherein the sealing plate contains an additional face seal 53. This face seal is shown on only one side of the plate, but it can be provided on either or both sides. As in the preceding embodiment, the sealing plate includes a transition bore to improve flow characteristics.

The embodiments of FIGS. 8A, 8B, 9A, and 9B therefore permit the use of slip-in valve modules, or other modules, that are smaller than the nominal line size, making it possible to provide the necessary components, having the desired performance characteristics, at reduced cost.

All of the plates described in this specification can be made of various materials, depending on the particular application. In standard petroleum-based hydraulic systems, steel is normally the preferred material for these plates.

The invention can be modified in many ways. The particular structure of the plates can be varied. The number of bolt holes, for example, can be changed. The number of ports accommodated in a single plate can be varied. The shape of the ports can change; the invention is not limited to ports having a circular cross-section. Many of the features of the invention, discussed above, can be combined in the same plate. These and other modifications, which will be apparent to those skilled in the art, should be considered within the spirit and scope of the following claims.

What is claimed is:

1. Apparatus for providing an interface between a fluid port and a fluid handling component, comprising:

a one-piece sealing plate, the sealing plate including a central bore, the sealing plate also including a plurality of bolt holes, the sealing plate having a first side and a second side, wherein the central bore transitions smoothly from a larger diameter portion to a smaller diameter portion, wherein substantially all of the central bore comprises a flow path for fluid, a flange body defining a housing for a fluid handling component, the flange body and the sealing plate having planar surfaces which directly abut each other along the second side of the sealing plate, the sealing plate being an unbroken material except at said central bore, the flange body having an internal bore which fully encloses a seal, the seal having a diameter greater than said smaller diameter portion of said central bore of said sealing plate, the seal being in contact with the sealing plate without preventing the sealing plate and the flange body from directly contacting each other, wherein the sealing plate comprises a structural support for the fluid handling component.

2. The apparatus of claim 1, wherein there are four bolt holes disposed symmetrically around the central bore.

3. The apparatus of claim 1, wherein the fluid handling component has a component diameter, and wherein the diameter of the smaller diameter portion of the central bore of the sealing plate generally equals the component diameter.

4. The apparatus of claim 1, wherein the sealing plate includes at least one face seal.

5. Apparatus for providing an interface between a fluid port and a fluid handling component, comprising:

a one-piece sealing plate, the sealing plate including a central bore, the sealing plate also including a plurality of bolt holes, the sealing plate having a first side and a second side, wherein the central bore transitions smoothly from a larger diameter portion to a smaller diameter portion, wherein substantially all of the central bore comprises a flow path for fluid, a flange body defining a housing for a fluid handling component, the flange body and the sealing plate having planar surfaces which abut each other along the second side of the sealing plate, the sealing plate being an unbroken material except at said central bore, wherein the sealing plate comprises a structural support for the fluid handling component, wherein the fluid handling component has a component diameter, and wherein the diameter of the smaller diameter portion of the central bore of the sealing plate generally equals the component diameter.

* * * * *